Oct. 1, 1929.  H. E. NORVIEL  1,730,233
ELECTRIC SWITCH
Filed Feb. 13, 1924   2 Sheets-Sheet 1

Inventor
Harry E. Norviel
By Spencer, Suvall and Hardman
His Attorneys

Patented Oct. 1, 1929

1,730,233

UNITED STATES PATENT OFFICE

HARRY E. NORVIEL, OF ANDERSON, INDIANA, ASSIGNOR, BY MESNE ASSIGNMENTS, TO DELCO-REMY CORPORATION, OF DAYTON, OHIO, A CORPORATION OF DELAWARE

ELECTRIC SWITCH

Application filed February 13, 1924. Serial No. 692,486.

This invention relates to electric switch mechanism and especially to such mechanisms adapted for use on automotive vehicles.

An object of this invention is to provide a switch mechanism adapted for use on the ignition systems of an automotive vehicle whereby the ignition can be shut off only by the operation of a lock key and wherein the lock key automatically shuts off the ignition and locks the same in off position when said key is moved to its withdrawal position.

Another object is to provide a combination ignition switch and parking light switch for an automotive vehicle and a common actuating means therefor so arranged that the ignition can be turned on only by turning off the parking light switch.

Another object is to provide such a combination switch wherein the common actuating means can be locked to prevent turning on the ignition but permits movement of the actuating means to turn the parking light on or off at will.

Further objects and advantages of the present invention will be apparent from the following description, reference being had to the accompanying drawings, wherein a preferred form of embodiment of the present invention is clearly shown.

In the drawings:

Fig. 6 shows the lock in unlocked position and the parking light turned on.

In the drawings, similar reference characters refer to similar parts throughout the several views.

Figure 8:
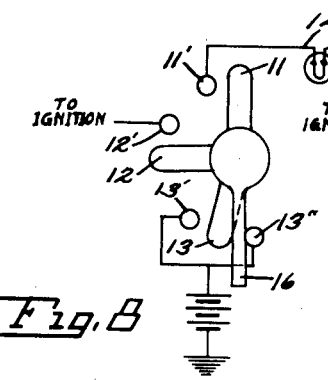
Fig. 8 is a diagrammatic view showing relative position of the switch contact points for Figs. 4 and 5.

The switch mechanism is supported and housed in a cup shaped casting 10 having suitable lugs and bosses preferably cast integral therewith for properly supporting the moving parts held therein. The three moving flexible contact arms 11, 12 and 13 are preferably integrally formed and are rigidly mounted upon but electrically insulated from the inner end of the rotatable shaft 15. This shaft is provided with an actuating lever 16 and by this means the contact arms 11, 12 and 13 may be rotated as a unit to the three positions shown in Figs. 8, 9 and 10 to close the ignition circuit through the stationary contact point 12' (see Fig. 10), to close the parking light circuit through the stationary contact point 11' (see Fig. 9), or to open both of these circuits (see Fig. 8).

Figure 1:
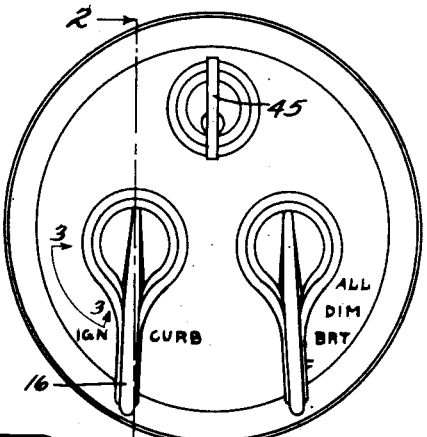
Fig. 1 is a front elevation of an automobile ignition and light switch built according to this invention.
Figure 2:
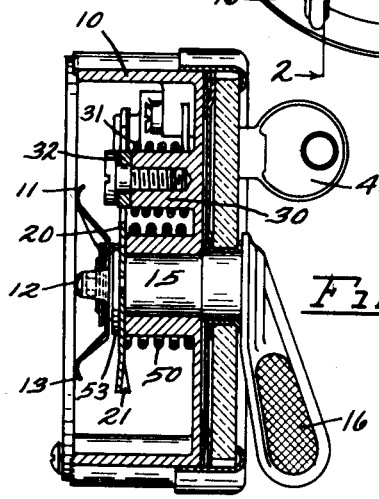
Fig. 2 is a sectional view along line 2—2 of Fig. 1.
Figure 3:
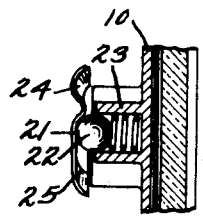
Fig. 3 is a sectional view along line 3—3 of Fig. 1.

The lock mechanism for the various positions of the switch will now be described. A disk 20 is rigidly mounted upon the inner end of shaft 15 and is rotatable therewith. Disk 20 is provided with a projecting flange 21 which projects over and presses upon the spring-pressed ball 22 which is suitably held in a hollow post 23 integral with the casting 10 (see Fig. 3). This flange 21 is provided with a short recess 24 and an elongated recess 25 into which the ball 22 is adapted to be yieldably pressed and thus act as a yieldable stop and locating means for the position of lever 16.

Figures 9, 10:
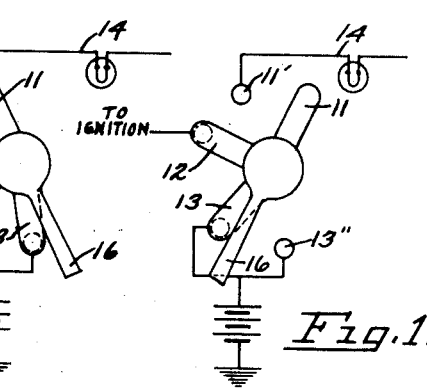
Fig. 9 is a similar view showing position of the contact points for Fig. 6.
Fig. 10 is a similar view showing position of the contact points for Fig. 7.

The disk 20 is also provided with a slot 26 for engagement with the pawl 27 and a wide slot 28 for engagement with the oppositely turned pawl 29. The pawls 27 and 29 are preferably integrally formed with the rocker bar 32 which is pivotally mounted upon the post 30. A coil spring 31 acts upon the rocker 32 to force pawl 27 into engagement with slot 26 and to force pawl 29 out of engagement with slot 28. A barrel lock 40 is mounted upon the casting 10 in such position that the rotatable cam 41 mounted upon the inner end of the rotatable barrel 42 of the lock 40 can ride upon the cam face 43 on the rocker 32, as clearly shown in Fig. 4. When the key 45 of lock 40 is in the position from which it can be withdrawn from the lock the cam 41 is in the position shown in Fig. 4 with the pawl 29 engaging the slot 28 to prevent clockwise rotation thereof as viewed from the front, and the pawl 27 is clear of slot 26. In this position the contact arms 11, 12, and 13 and the manual lever 16 are in the position shown in Fig. 8. From this position the lever 16 can be moved to the right, as shown in Fig. 9, the disk 20 moving to position shown in Fig. 6 and the ball 22 camming into the short recess 24 in the flange 21 thus acting to locate the contact arms 11 and 13 to make proper switch connections for the parking light circuit 14. It will now be clear that the parking light circuit 14 can be made or broken at will by the movement of lever 16 regardless of the fact that pawl 29 prevents the rotation of lever 16 in a clockwise direction beyond the position shown in Fig. 8.

Figure 6:
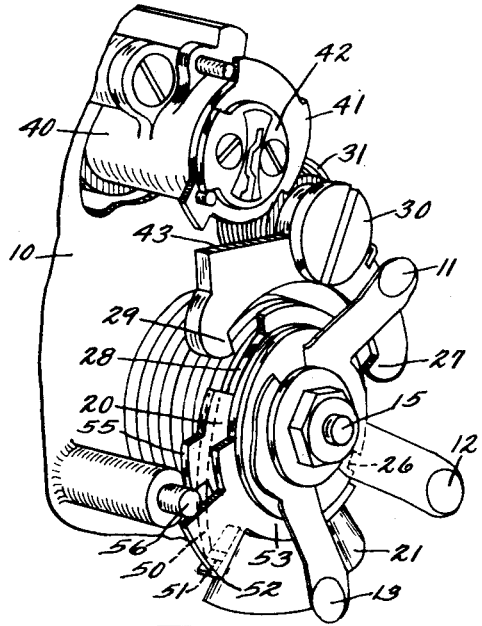
Figure 5:
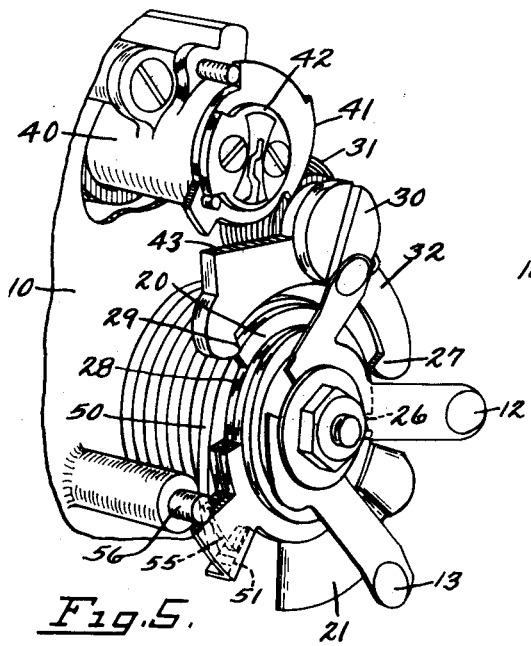
Fig. 5 is a similar perspective view showing ignition and parking light off but the lock turned to unlocked position.
Figure 7:
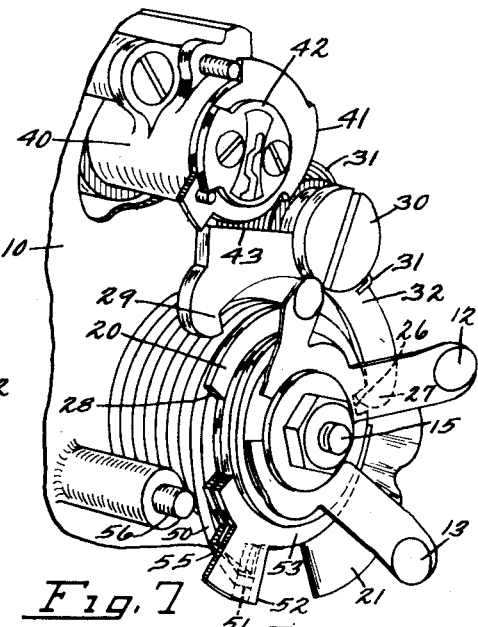
Fig. 7 shows the lock in position shown in Figs. 5 and 6 and the ignition turned on and automatically locked in on position.

When it is desired to close the ignition circuit the key 45 must first be turned to rotate cam 41 out of engagement with the rocker 32 whereupon the coil spring 31 raises pawl 29 out of the slot 28 and causes pawl 27 to be pressed down upon the periphery of disk 20. The position of the parts will then be as shown in Fig. 5 if the parking light circuit is off, and as shown in Fig. 6 if the parking light circuit is on. From either of these positions the ignition circuit may be closed by moving lever 16 to position shown in Fig. 10. In so doing the disk 20 is rotated until pawl 27 snaps into the slot 26 and thus locks the disk 20 against any further movement in either direction, the parts then being as shown in Fig. 7. A coil spring 50 resists the movement of lever 16 from the position shown in Fig. 8 to that shown in Fig. 10. The upturned end 51 of spring 50 engages behind a projection 52 on a ring 53 which is freely rotatably mounted on the shaft 15 above the disk 20. A lug 55 on disk 20 engages the projection 52 when lever 16 is in the position of Fig. 8 and when said lever 16 is moved to position of Fig. 10 the coil spring 50 is thereby coiled up. Therefore when disk 20 is released from the pawl 27 the spring 50 acting through projection 52 and lug 55 will cause it to snap back into position shown in Fig. 5. The stop 56 engages projection 52 at this point and thus prevents any further action of spring 50 on disk 20.

Figure 4:
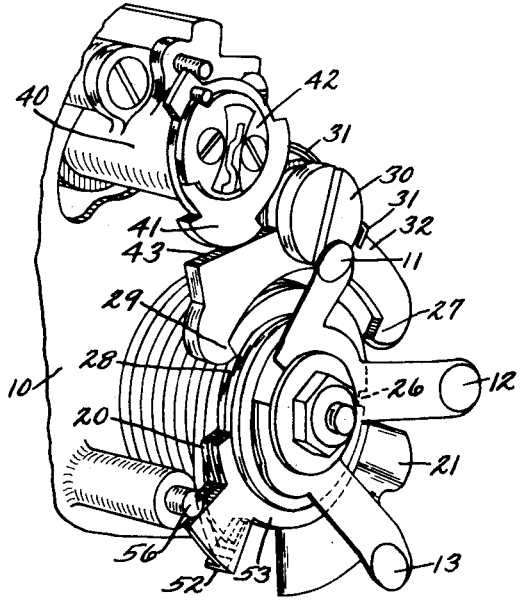
Fig. 4 is a perspective view from the back of the switch showing the parts in position when ignition is locked off and parking light is turned off.

Therefore when it is desired to open the ignition circuit the key 45 must be used to rotate cam 41 against rocker 32 and thereby release pawl 27 from slot 26. Immediately upon such release the lever 16 snaps back to off position (Fig. 8) under the force of the coiled spring 50. While pawl 27 is being released from slot 26 the opposite pawl 29 is being moved into the slot 28 and thus locks lever 16 in ignition off postion. This position of the parts is shown in Fig. 4. As already explained above, pawl 29 simply locks lever 16 against movement to turn on the ignition and permits movement of said lever to turn on or off the parking light circuit at will.

It will now be clear that before the ignition of an automobile engine can be shut off the lock key must be turned to its withdrawal position. Hence the driver merely has to pull the key straight out to remove it, and since he must take hold of the key to stop the engine he can hardly forget to remove the key and lock the car. The removal of the key however still permits the parking lights to be turned on or off at will.

Now when the driver starts the car at night when the parking lights are on he inserts the key 45 and unlocks the lock and moves lever 16 over to ignition on position. This movement automatically turns off the parking lights and so eliminates the necessity of worrying about turning off parking lights.

While the form of embodiment of the present invention as herein disclosed, constitutes a preferred form, it is to be understood that other forms might be adopted, all coming within the scope of the claims which follow.

What is claimed is as follows:

1. In combination, an electric switch having an operating handle therefor, a lock mechanism operated by a key for locking said handle in either switch open or switch closed position, said locking mechanism including automatic means for throwing said handle to switch open position and locking said handle in open position by the operation of said key.

2. In combination, an electric switch having a manual operating lever for closing said switch, a key operated lock mechanism whereby said switch may be locked in either open or closed position, said mechanism including means for automatically opening said switch and locking it in open position by a single movement of said key.

3. In combination, an electric switch having a manual operating means therefor, a key operated lock mechanism for locking said switch in either off or on position, said mechanism including means for automatically throwing said switch to off position and locking said switch in off position by a single movement of said key.

4. In combination, an electric switch having a manual operating means therefor, a key operated lock mechanism for locking said means in off position, said mechanism including means to automatically move said operating means to off position when the lock key is moved to its withdrawal position.

5. In combination, an electric switch having a manual operating means therefor, a key operated lock mechanism for locking said means in either on or off position, said mechanism including means to automatically move said operating means to off position when the lock key is moved to its withdrawal position.

6. In combination, an electric switch having a manual operating means therefor, a key operated lock mechanism for locking said means in either on or off position, said mechanism including means to automatically move said operating means to and lock the same at its off position when the lock key is moved to its withdrawal position.

7. An electric switch having a manual operating means for moving said switch to on position, a key lock mechanism for automatically locking said switch in on position, said lock mechanism including means to automatically move said operating means to off position when the lock key is moved to withdrawal position.

8. An electric switch having a manual operating means for moving said switch to on position, a key lock mechanism for automatically locking said switch in on position, said mechanism including means to automatically move said operating means to and lock the same at its off position when the lock key is moved to withdrawal position.

9. An electric switch adapted for use as the ignition switch for an automobile engine and having a manual operating means therefor, a key lock mechanism for automatically locking said switch in on position, said mechanism including means to automatically move said operating means to off position when the lock key is moved to withdrawal position, and a second switch operable to either off or on position by an additional movement of said operating means from its off position.

10. An electric switch adapted for use as the ignition switch for an automobile engine and having a manual operating means therefor, a key lock mechanism for automatically locking said switch in on position and including means to automatically move said operating means to and lock the same at its off position when the lock key is moved to withdrawal position, and a second switch operable to either off or on position by an additional movement of said operating means from its off position.

11. An electric switch, comprising, in combination, a circuit controller having a handle for operating it; a detent adapted to engage the circuit controller to hold it in either its off or on position; a key operated lock mechanism for controlling the detent; and means connected with the circuit controller and adapted to automatically move it into off position when the detent releases said controller in the on position.

12. An electric switch comprising, in combination, a circuit controller having on and off positions; a handle for operating the controller to the on position; a detent operable to engage and lock the controller in either one of its positions; a key operated lock mechanism engageable with the detent to control its position; and a spring engaging the controller, and adapted automatically to move it to the off position when the detent releases the controller.

13. An electric switch comprising, in combination, a circuit controller having on and off positions; a lever handle for operating said controller to the on position; a detent, pivotally mounted and having oppositely disposed arms including latching tongues adapted to be moved into locking engagement with the controller; a key operated lock having a cam adapted to engage one arm of the detent to move its latching tongue into locking engagement with the controller whereby it will be held in off position; a spring for moving the detent so that the other latching tongue will slidingly engage with the controller when the lock cam is operated to release the detent, said controller having a notch for receiving said second named tongue when the controller lever is operated to the on position, thus locking said controller in this on position; and a spring engaging the controller, said spring moving the controller lever automatically into the off position when the key is operated to cause the lock cam to again engage the detent and operate it to release the controller.

14. A lock controlled electric switch embodying a rotatable circuit making and breaking member, a handle for operating said member, and a key controlled member adapted to engage and hold said handle against movement when the key is in the lock and said first member is in circuit making position.

15. A lock controlled electric switch embodying a rotatable circuit making and breaking member, a handle for operating said member, a key controlled member adapted to engage and hold said handle against movement when the key is in the lock and said first member is in circuit making position, and means for moving said first member into circuit breaking position on the withdrawal of the key from the lock.

In testimony whereof I hereto affix my signature.

HARRY E. NORVIEL.